US011910044B1

United States Patent
Li et al.

(10) Patent No.: US 11,910,044 B1
(45) Date of Patent: Feb. 20, 2024

(54) SYSTEMS AND METHODS FOR SWITCHING THE PROCESSING OF A LIVE CONTENT STREAM TO ANOTHER DATACENTER

(71) Applicant: Amazon Technologies, Inc., Seattle, WA (US)

(72) Inventors: Xiangbo Li, San Diego, CA (US); Selvanayagam Sendurpandian, Livermore, CA (US); Benjamin Hirsch, San Franciso, CA (US); Alex Converse, Oakland, CA (US); Luke Curley, El Cerrito, CA (US); Nagendra Akula Suresh Babu, San Jose, CA (US); Rohit Puri, Saratoga, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/855,361

(22) Filed: Jun. 30, 2022

(51) Int. Cl.
  *H04N 21/266* (2011.01)
  *H04N 21/262* (2011.01)
  *H04N 21/242* (2011.01)
  *H04N 21/2187* (2011.01)

(52) U.S. Cl.
  CPC ....... *H04N 21/266* (2013.01); *H04N 21/2187* (2013.01); *H04N 21/242* (2013.01); *H04N 21/26258* (2013.01)

(58) Field of Classification Search
  CPC ............. H04N 21/266; H04N 21/2187; H04N 21/242; H04N 21/26258
  See application file for complete search history.

(56) References Cited

U.S. PATENT DOCUMENTS 5,991,799 A * 11/1999 Yen ...................... G06F 16/9535
  715/718
7,299,275 B2 * 11/2007 Tsukidate ............. H04N 21/222
  348/E7.075

(Continued)

FOREIGN PATENT DOCUMENTS

CN 110213617 A 9/2019

OTHER PUBLICATIONS

U.S. Appl. No. 17/850,493, "Dynamically Moving Transcoding of Content Between Servers", filed Jun. 27, 2022, 43 pages.

*Primary Examiner* — Michael B. Pierorazio
(74) *Attorney, Agent, or Firm* — Kilpatrick Townsend & Stockton LLP

(57) ABSTRACT

Techniques for migrating live broadcast streams from one data center to another data center are described herein. A data center from a plurality of data centers may be determined to transfer live streaming video content from a first data center to the data center. A separate live streaming session for each live streaming session being broadcast by the first data center may be generated by communicating with an ingest service server that receives media content used to generate each separate live streaming session and the live streaming session. Each separate live streaming session may be routed to the candidate data center. A determination that each separate live streaming session of the candidate data center is synchronized with each live streaming session of the first data center may be made. An update to a mapping of IP addresses to redirect requests from the first data center to the candidate data center.

20 Claims, 7 Drawing Sheets

(56) References Cited

U.S. PATENT DOCUMENTS

| | | | | |
|---|---|---|---|---|
| 7,337,392 B2* | 2/2008 | Lue | G06F 16/9577 | 715/236 |
| 7,369,749 B2* | 5/2008 | Ichioka | H04N 21/4335 | 386/346 |
| 7,506,355 B2* | 3/2009 | Ludvig | H04N 21/433 | 715/201 |
| 7,603,683 B2* | 10/2009 | Reto | H04N 21/47202 | 709/204 |
| 7,653,921 B2* | 1/2010 | Herley | H04N 21/4332 | 382/199 |
| 7,712,125 B2* | 5/2010 | Herigstad | H04N 21/4755 | 725/38 |
| 7,734,579 B2* | 6/2010 | White | H04N 5/76 | 707/696 |
| 7,849,207 B2* | 12/2010 | Kazmi | H04L 65/612 | 709/219 |
| 7,908,625 B2* | 3/2011 | Robertson | H04N 7/106 | 725/141 |
| 8,307,395 B2* | 11/2012 | Issa | H04L 67/1065 | 725/54 |
| 8,813,149 B2* | 8/2014 | Marignan | H04N 21/2187 | 725/109 |
| 8,839,295 B2* | 9/2014 | Kim | H04N 21/4821 | 725/40 |
| 10,277,924 B1* | 4/2019 | Stewart | H04N 21/8456 | |
| 10,313,710 B1* | 6/2019 | Karlsson | H04N 21/2665 | |
| 10,454,985 B2* | 10/2019 | Stockhammer | H04L 67/02 | |
| 10,979,477 B1* | 4/2021 | Cabrido | H04L 65/611 | |
| 11,108,840 B2* | 8/2021 | Shi | H04L 65/75 | |
| 11,412,278 B1* | 8/2022 | Robinson | H04N 21/64784 | |
| 2003/0061206 A1* | 3/2003 | Qian | G06F 16/48 | |
| 2003/0063217 A1* | 4/2003 | Smith | H04N 7/17309 | 348/460 |
| 2004/0103426 A1* | 5/2004 | Ludvig | H04H 20/86 | 348/E7.071 |
| 2004/0148571 A1* | 7/2004 | Lue | G06F 16/9577 | 715/239 |
| 2004/0215718 A1* | 10/2004 | Kazmi | H04L 67/02 | 709/203 |
| 2005/0005025 A1 | 1/2005 | Harville et al. | | |
| 2005/0066352 A1* | 3/2005 | Herley | H04N 21/42203 | 348/E7.071 |
| 2005/0144455 A1* | 6/2005 | Haitsma | G06F 16/634 | 713/176 |
| 2005/0262542 A1* | 11/2005 | DeWeese | H04N 21/254 | 348/E7.071 |
| 2006/0031883 A1* | 2/2006 | Ellis | H04N 7/17318 | 348/E7.071 |
| 2006/0031889 A1* | 2/2006 | Bennett | H04N 21/41265 | 348/E7.071 |
| 2006/0190966 A1* | 8/2006 | McKissick | H04N 7/147 | 348/E7.071 |
| 2007/0124756 A1* | 5/2007 | Covell | G06F 16/635 | 348/E7.071 |
| 2007/0157281 A1* | 7/2007 | Ellis | H04N 21/4147 | 725/74 |
| 2008/0027953 A1* | 1/2008 | Morita | G06F 16/40 | |
| 2008/0059532 A1* | 3/2008 | Kazmi | G06F 21/10 | |
| 2008/0060036 A1* | 3/2008 | Cox | G06Q 40/12 | 725/110 |
| 2008/0109477 A1* | 5/2008 | Lue | G06F 16/9577 | 707/999.102 |
| 2008/0133701 A1* | 6/2008 | Kazmi | H04L 67/06 | 709/217 |
| 2008/0215170 A1* | 9/2008 | Milbrandt | H04L 67/306 | 707/999.01 |
| 2008/0235733 A1* | 9/2008 | Heie | H04N 21/482 | 725/46 |
| 2009/0037954 A1* | 2/2009 | Nagano | H04N 21/235 | 725/39 |
| 2009/0119708 A1* | 5/2009 | Harrar | G06F 8/38 | 725/38 |
| 2009/0320058 A1* | 12/2009 | Wehmeyer | H04N 21/2221 | 725/63 |
| 2009/0320072 A1* | 12/2009 | McClanahan | H04N 21/4532 | 725/47 |
| 2009/0320073 A1* | 12/2009 | Reisman | H04H 20/38 | 709/227 |
| 2010/0121936 A1* | 5/2010 | Liu | H04L 65/60 | 709/217 |
| 2010/0131385 A1* | 5/2010 | Harrang | G06Q 30/0631 | 705/26.1 |
| 2010/0251292 A1* | 9/2010 | Srinivasan | H04N 21/47205 | 725/62 |
| 2010/0296487 A1* | 11/2010 | Karaoguz | H04W 36/04 | 370/332 |
| 2011/0066744 A1* | 3/2011 | Del Sordo | H04N 21/4305 | 709/231 |
| 2011/0068899 A1* | 3/2011 | Ioffe | G05B 15/02 | 340/8.1 |
| 2011/0086619 A1* | 4/2011 | George | H04M 1/72415 | 455/414.1 |
| 2011/0138064 A1* | 6/2011 | Rieger | G06F 16/9577 | 707/715 |
| 2011/0191439 A1* | 8/2011 | Dazzi | G06F 16/40 | 709/217 |
| 2011/0191446 A1* | 8/2011 | Dazzi | H04L 67/1095 | 709/219 |
| 2012/0072961 A1* | 3/2012 | Marignan | H04N 21/64322 | 725/109 |
| 2012/0117590 A1* | 5/2012 | Agnihotri | H04N 21/441 | 725/30 |
| 2012/0278725 A1* | 11/2012 | Gordon | H04N 21/858 | 715/738 |
| 2012/0291079 A1* | 11/2012 | Gordon | H04N 21/2387 | 725/109 |
| 2015/0341407 A1 | 11/2015 | Agnoli et al. | | |
| 2020/0382803 A1 | 12/2020 | Zhang et al. | | |
| 2021/0195264 A1* | 6/2021 | Shi | H04N 21/242 | |
| 2021/0211484 A1* | 7/2021 | Sodagar | H04N 21/6581 | |
| 2021/0281621 A1* | 9/2021 | Sodagar | H04L 67/02 | |
| 2022/0217190 A1* | 7/2022 | Sodagar | H04N 21/6582 | |
| 2022/0217194 A1* | 7/2022 | Sodagar | H04L 65/65 | |

* cited by examiner

SYSTEMS AND METHODS FOR SWITCHING THE PROCESSING OF A LIVE CONTENT STREAM TO ANOTHER DATACENTER

BACKGROUND

Live streaming content providers can enable users to explore, interact, and consume a variety of events (live sports games, live video game eSport events, live video game streaming content, etc.) and thereby explore a variety of real, virtual or non-real (e.g., fantasy or sci-fi) environments from the safety and comfort of their own homes. As streaming technology advances and the audience demand increases, more live streaming content providers seek to engage more users and satisfy the demand by providing additional content streams without interruptions or network bandwidth issues. However, data centers which host content provided by content providers as well as respond to requests for the content from viewers may experience issues which can interrupt a live stream broadcast. Users could attempt to switch between live streams of an event but they may miss out on key moments from a particular stream that they were engaged in. Conventional technology solutions may fail to provide adequate and live stream migration techniques which can be performed without interruption to the viewer or streamer.

BRIEF DESCRIPTION OF THE DRAWINGS

Various embodiments in accordance with the present disclosure will be described with reference to the drawings, in which.

DETAILED DESCRIPTION

Figure 1:
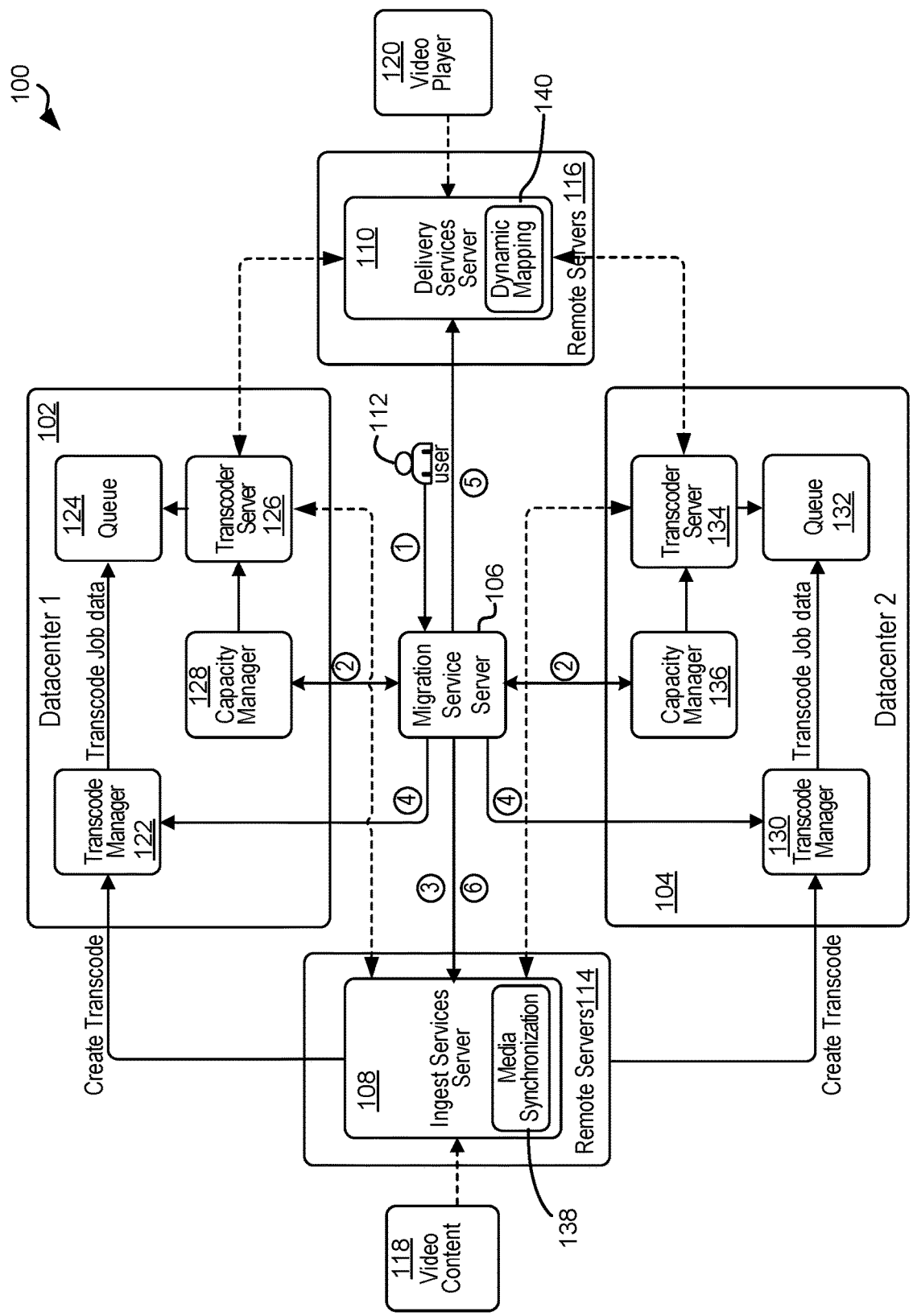
FIG. 1 illustrates an example architecture for a migration feature including one or more servers and data centers, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein provide for implementation of a migration feature that seamlessly migrates a live content stream (e.g., live streaming video, live streaming video games, etc.) from one data center to another data center. The migration feature described herein provides a solution for migrating live content streams from one data center, which is experiencing problems or issues (e.g., software malfunctions, power issues, and weather issues) that affect the broadcasting capability of the data center to another data center. In embodiments, service provider computers implementing the migration feature may receive a request to migrate the live content streams from a first data center that is experiencing broadcasting issues to another data center. The service provider computers may utilize information such as the current capacity of the first data center as well as available capacity of another data center to identify an appropriate data center for migration (herein referred to as a "second data center" or a "candidate data center"). In some embodiments, the information may include geographic location information for the first data center and the second data center (also referred to as "target data center" or "candidate data center"). The geographic location information for the data centers may be utilized by the service provider computers to identify a data center that is geographically closest or proximal to the first data center (also referred to as a "source data center") experiencing issues to reduce latency to viewers of the broadcast live content streams.

In accordance with at least one embodiment, the migration features described herein can eliminate any further interruptions or issues that may be perceived by viewers of the live content streams that are broadcast by the data center experiencing issues as the live content streams are migrated to the new data center. Likewise, the content creators that are providing media content to the data center that is experiencing issues can continue to generate and provide content without interruptions or down time. In accordance with at least one embodiment, the service provider computers implementing the migration features may synchronize all media streams from the data center experiencing issues with another data center as well as route content requests from viewers or media players to retrieve said media streams from the target data center. In embodiments, the service provider computers, upon identifying an appropriate target data center for migration, may generate a separate live streaming session for each live streaming session being broadcast by the first data center experiencing issues. The separate live streaming sessions are then routed to the target data center (second data center or candidate data center). Upon performing these processes, the first data center and the target data center would be broadcasting or streaming the same live content streams simultaneously. The simultaneous broadcast of the same live content streams may continue for a certain period of time. During this period of time the service provider computer may utilize information, such as metadata, time stamps, media segments, and/or playlists from both data centers live streams to verify synchronization between the live streams being broadcast by both data centers.

In accordance with at least one embodiment, upon verifying or determining that the live streams are synchronized between both data centers, instructions may be generated and transmitted to an associated delivery service server to redirect requests for content from viewers from the first data center (e.g., the data center experiencing issues) to the second data center (the recently migrated to data center). The instructions for the delivery service server may include an update to internet protocol (IP) addresses maintained by the delivery service server such that the IP addresses are updated to direct incoming requests for content from the first data center to the second data center or target data center. In some embodiments, the instructions may include updates for media playlists or segments maintained by the delivery service server. The service provider computers implementing the migration feature may generate and transmit instructions to an ingest service server that is configured to receive and process live streaming content from content creators to disconnect each live streaming session being broadcast by the first data center experiencing issues.

The service provider computers implementing the migration features may confirm that no live streams are being broadcast by the first data center by communicating with the first data center. By utilizing the migration features described herein the service provider computers may identify an appropriate data center to migrate live streams to from a data center experiencing issues, generate copies of the same live streams being broadcast by the data center experiencing issues, route the copies of the live streams to the appropriate data center, and direct requests for said live streams to the appropriate data center. These processes ensure that both the content creator and viewers of the live streaming content are not interrupted as the live streams are synchronized between the data centers and redirect instructions are not implemented until synchronization is verified. Although use cases and examples described herein may refer to identification of only a single target or candidate data center embodiments described herein are not limited to such use cases. For example, the migration features implemented by the service provider computers may identify one or more appropriate candidate or target data centers to migrate live streams to from a malfunctioning data center. In accordance with at least one embodiment, the service provider computers may obtain geographical location information for the viewers of each live content stream being broadcast by the malfunctioning data center. An amount of viewers associated with a certain geographic location may be compared to a threshold to determine whether one or more target or candidate data centers are required for seamless migration. For example, if 25% of the viewers of a live content stream are geographically closer to data center D, and 65% of the viewers are geographically closer to data center E, the service provider computers may identify data center D, data center E, and another data center for the remaining percentage of viewers as appropriate target or candidate data centers to migrate the live streams to from a malfunctioning data center.

Conventional solutions to issues with data centers which host and broadcast live content streams to viewers lack the ability to seamlessly migrate data streams between data centers. For example, conventional solutions may receive an issue about a malfunctioning data center and redirect all new requests to provide and view content from the malfunctioning data center to a new data center. However, content creators who are providing content to the malfunctioning data center as well as viewers of said content would be required to disconnect and reconnect (e.g., end broadcasts, begin a new broadcast for the content creator; end a viewing session and reconnect or provide another request for content for the viewer) to be redirected to a properly functioning data center. These conventional solutions introduce a poor viewing and broadcasting experience that results in disjointed streaming sessions from both the content provider and viewer viewpoint. Moreover, further delays and latency may be introduced as the new reconnect requests to the newly identified data center may receive an inordinate amount of connection requests. Additionally, conventional solutions may fail to identify an appropriate target data center as they may fail to utilize available capacity and/or geographical location of a target data center as well as geographical location information of the viewers associated with the live content streams being broadcast by the malfunctioning data center. Systems and methods described herein provide seamless migration solutions by identifying an appropriate target data center using updated capacity and other information, generating synchronized live streams, and redirecting requests and content providing information to the target data center before disconnecting the live content streams from the malfunctioning data center. By utilizing the migration features described herein viewers and content creators alike will not have to disconnect and reconnect to a service or data center to continue a live streaming session.

FIG. 1 illustrates an example architecture 100 for a migration feature including one or more servers and data centers, in accordance with at least one embodiment. Architecture 100 includes Datacenter 1 102, Datacenter 2 104, migration service server 106, ingest services server 108, delivery services server 110, and user 112. In embodiments, Datacenter 1 102, Datacenter 2 104, migration service server 106, ingest services server 108, delivery services server 110, and user 112 may be in communication via one or more available networks such as the Internet. Migration service server 106 may be an example of service provider computers implementing the migration features described herein. User 112 may communicate with migration service server 106 via a user device (not pictured). In embodiments, ingest service server 108 may be hosted or implemented by one or more remote servers 114 and delivery services server 110 may be hosted or implemented by one or more remote servers 116. In embodiments, Datacenter 1 102 and Datacenter 2 104 may include one or more groups of server computers that are configured to host different services such as live content streaming services as well as broadcasting of said live content streaming to one or more viewers. In accordance with at least one embodiment, each data center (102 and 104) may be maintained or implemented in a different geographical location. In embodiments, remote servers 114 and 116 may represent a deployment of one or more sever computers implemented in a colocation facility of the data centers 102 and 104. The remote servers 114 and 116 may be implemented and located at major Internet exchange points.

The architecture 100 also includes video content 118 and video player 120. In embodiments, video content 118 may represent one or more video content providers or generates which provide the media content that comprises the live content streams broadcast by data centers 102 and 104. The video player 120 may refer to one or more user devices which request, on behalf of viewers, the content provided by the content providers (video content 118) and broadcast by data centers 102 and 104. In accordance with at least one embodiment, the ingest services server 108 may be configured to receive media content provided via video content 118, add or generate metadata for segmenting and aligning media segments of content, and provide it to the transcoding service of the data centers 102 and 104. The delivery services server 110 may be configured to fetch and cache, from data centers 102 and 104, media segments and playlists as well as provide them back to systems that request the segments and playlists such as the video player 120. In embodiments, Datacenter 1 102 may include a transcode manager 122, a queue 124, transcode server 126, and capacity manager 128. Datacenter 2 104 may include its own version of the same components (e.g., 130-136).

In accordance with at least one embodiment, the capacity managers 128 and 136 may be configured to track, maintain, and provide current or available capacity for each associated data center (102 and 104) to the migration service server 106. In embodiments, ingest services server 108 may include media synchronization module 138 and delivery services server 110 may include dynamic mapping module 140. The media synchronization module 138 may be configured to determine or verify live content stream synchronization between data centers 102 and 104. Verifying or determining media synchronization is described in more detail below with reference to FIG. 3. The dynamic mapping module 140 may be configured to update the mapping of IP addresses for incoming content requests from video player 120 from a malfunctioning data center to the migrated to data center (e.g., from Datacenter 1 102 to Datacenter 2 104). The dynamic mapping module 140 may be configured to route requests of content to the correct data center as well as respond with the correct media segments and playlists to requests for content from the video player 120. As described herein, once migration is complete the requests for content from video player 120 would be redirected from the malfunctioning Datacenter 1 102 and to the migrated to Datacenter 2 104 thereby preventing any interruptions to content requests by viewers.

The architecture 100 illustrates one or more computer systems/servers which are configured to receive live media content provided by content providers/generators and provide it to viewers. For example, when video content 118 is provided to ingest services server 108, the ingest services server 108 may be configured to invoke on or more applications, programs, application program interface (API) calls, or modules to process the incoming live media content. This can include transcoding, output format conversion, watermarking, etc. As illustrated in FIG. 1, the ingest services server 108 may communicate with transcode manager 122 and/or 130 to initiate video processing by invoking a create transcode API. In accordance with at least one embodiment, the transcode managers 122 and 130 may be configured to create a transcode entry in a database (not pictured) of their respective data centers (102 and 104) as well as generate transcode job data. The transcode job data is added to the queues 124 and 132 of data centers 102 and 104. In accordance with at least one embodiment, the transcode severs 126 and 134 are configured to retrieve the transcode job data from queues 124 and 132 and process the live video. The transcode servers 126 and 134 are configured to generate video segments and variant playlists which are transmitted, upon request, to delivery services server 110. The delivery services server 110 can use such generated video segments and variant playlists to respond to content requests from video player 120.

To perform media synchronization between the live content streams that are being broadcast by the malfunctioning data center (Datacenter 1 102) the ingest services server 108, in response to instructions from migration service server 106, may split incoming media content of a real-time messaging protocol (RTMP) stream from the video content 118 to transmit the same incoming media content to any data center, such as Datacenter 2. The ingest services server 108 and/or media synchronization module 138 implement a segmentation algorithm that can be used whenever generating a new media segment. The segmentation algorithm may generate segment start metadata and a tag for the new media segment. The segment start metadata may include a timestamp for the media segment, composition time, and IDR information which can be used by the transcode managers 122 and 130 to process and output the correct media segment sequence number and time stamp. By utilizing such systems any new transcode manager, queue, and transcode server can connect to the same RTMP stream from the video content 118 and generate the same segments and playlists as the malfunctioning data center (Datacenter 1 102).

FIG. 1 also depicts a process for migrating live content streams from a malfunctioning data center (Datacenter 1 102) to a properly functioning and appropriate data center (Datacenter 2 104). FIG. 1 utilizes two different types of arrows solid and dashed lined arrows. The solid arrows represent the communication of metadata or control data between entities in architecture 100 whereas the dashed line arrows represent the communication of video data between the entities in architecture 100. The process of FIG. 1 includes user 112 requesting the shifting or migration of the live content streams being broadcast by Datacenter 1 102 to an appropriate data center by transmitting the request to migration service server 106 at step 1. Although FIG. 1 illustrates user 112 invoking or requesting the migration of the live content streams from Datacenter 1 102 to another data center embodiments disclosed herein are not limited to such use cases. For example, in some embodiments the migration service server 106 may receive alarms, notifications, or information from a malfunctioning data center (e.g., Datacenter 1 102) which indicates a malfunction, issues, problems, or errors occurring with some service of the data center or its broadcasting ability. In such examples the migration service server 106 may automatically and without the request from user 112 determine an appropriate data center to migrate the live content streams to as well as execute the rest of the migration features described herein.

The process of FIG. 1, at step 2, includes the migration service server 106 requesting or otherwise obtaining a capacity from capacity managers 128 and 136. In embodiments, the capacity may include a real time transcode capacity of the data centers 102 and 104 (current and/or available capacity), a number of live streams being broadcast, network bandwidth, and available computer resources for each data center 102 and 104. Step 2 of the process of FIG. 1 also includes determining, by the migration service server 106 an appropriate data center for migrating the live content streams of Datacenter 1 102 to. The determination of the appropriate data center (e.g., Datacenter 2 104) may include comparing capacities to ensure that the target data center has the capability to host all the potentially migrated live content streams. The determination of the appropriate data center can also include comparing geographical locations of the data centers 102 and 104 to identify a geographically closest or proximal data center to the malfunctioning data center. Other information, as described herein, may be used to determine an appropriate target data center for migrating the live content streams to. In FIG. 1, the target or appropriate data center determined by the migration service server 106 is Datacenter 2 104. The process of FIG. 1, at step 3, includes generating, by the migration service server 106 communicating/instructing the ingest services server 108, a separate live streaming session for each live streaming session currently being broadcast by Datacenter 1 102. In embodiments, the ingest services server 108 and media synchronization module 138 may be configured to synchronize the separate live streaming sessions which are a copy of the live streaming sessions currently being broadcast by Datacenter 1 102. Step 3 of the process of FIG. 1 also includes the migration service server 106 instructing the ingest services server 108 to route the newly generated separate live streaming sessions to Datacenter 2 104.

The process of FIG. 1, at step 4, includes the migration service server 106 verifying that the live media streams being broadcast by Datacenter 1 102 and Datacenter 2 104 are synchronized. The verification of synchronicity can occur upon expiration of a certain time period, such as 60 seconds. As described above and with reference below to FIG. 3, the transcode manager 130 and transcode manager 122 may provide metadata or other information to the migration service server 106 to compare and verify synchronized live content streams. The process of FIG. 1, at step 5, includes the migration service server 106 communicating or instructing the delivery services server 110 to updating a mapping of IP addresses maintained by the delivery services server 110 to redirect requests for content from the video player 120 from malfunctioning Datacenter 1 102 to Datacenter 2 104. The instructions from migration service server 106 may include updating a mapping of the playlist and media segments to Datacenter 2 104. The process 100 of FIG. 1, at step 6, includes the migration service server 106 instructing the ingest services server 108 to disconnect each live session being transmitted to the malfunctioning data center (Datacenter 1 102).

Figure 2:
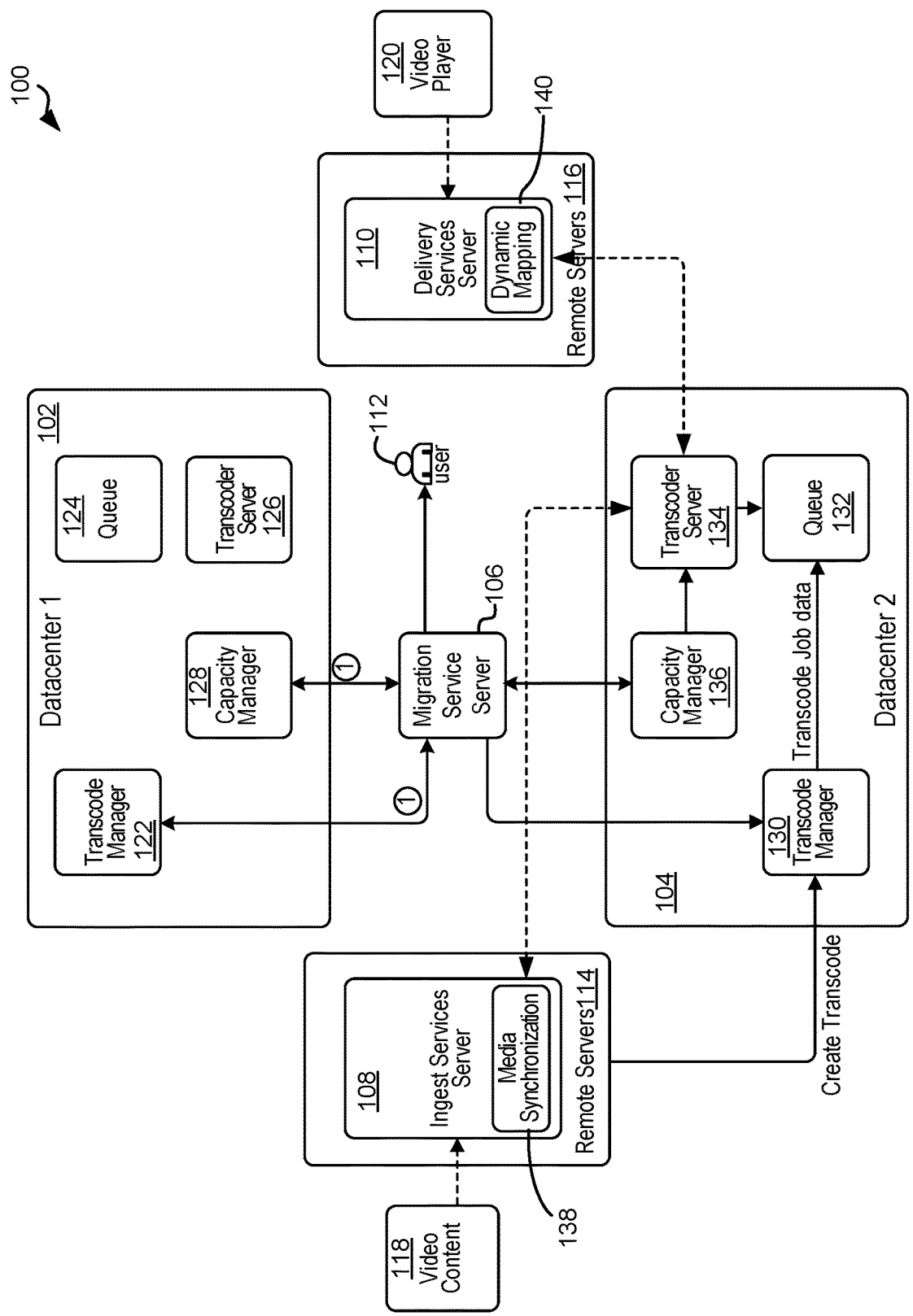
FIG. 2 illustrates an example architecture for a migration feature including one or more servers and data centers in accordance with at least one embodiment.

FIG. 2 illustrates an example architecture 100 for a migration feature including one or more servers and data centers in accordance with at least one embodiment. The architecture 100 of FIG. 2 illustrates the flow of content from the video content 118 (content providers or generators) to the viewers (via video player 120) after the live content streams have been migrated to Datacenter 2 104 following the steps of the process of FIG. 1. In embodiments, the migration service server 106 may generate and transmit a request to transcode manager 122 and/or capacity manager 128 to confirm that all live content streams are disconnected from Datacenter 1 102. The migration service server 106 may receive a response to the request from Datacenter 1 102, transcode manager 122 and/or capacity manager 128. The response may be transmitted to user 112 via a user device (not pictured) displaying a user interface that presents the response to the confirmation that the live content streams are disconnected from Datacenter 1 102.

In embodiments, as part of the process of migrating the live content streams from Datacenter 1 102 to Datacenter 2 104, the dynamic mapping module 140 of delivery services server 110 may be configured to forward or redirect requests for content to the correct data center (e.g., Datacenter 2 104). In accordance with at least one embodiment, the migration service server 106 may be configured to communicate with the dynamic mapping module 140 to update the mapping of media segments and playlists as each live content stream is migrated from Datacenter 1 102 to Datacenter 2 104. The dynamic mapping module 140 and delivery services server 110 are configured to, upon requests for content from the video player 120, route the requests to the correct data center (Datacenter 2 104) and return the correct media segments and playlists for playback to occur without any discrepancy in media URLs, sequence numbers, or timestamps resulting in seamless playback to the viewer associated with the video player 120.

Figure 3:
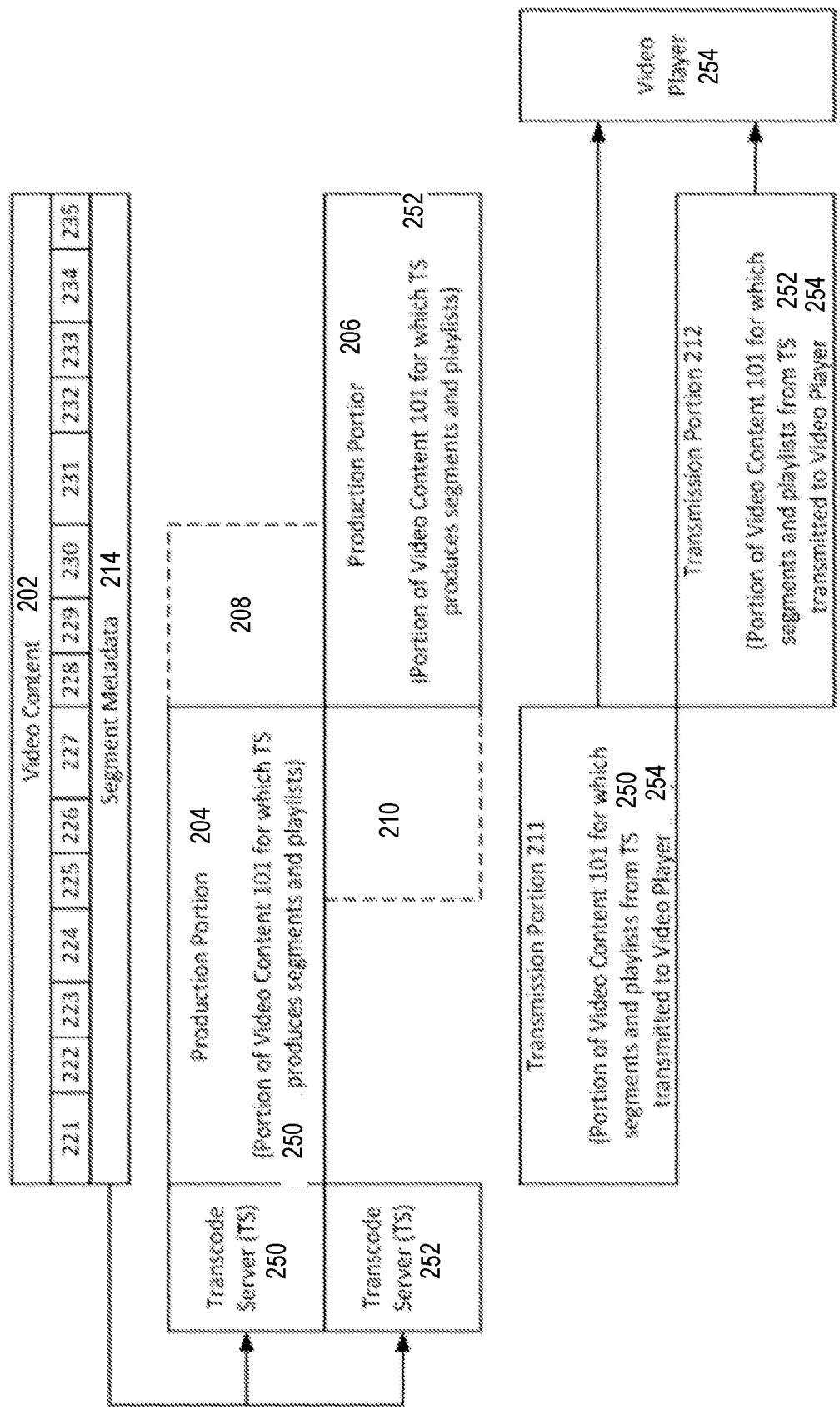
FIG. 3 illustrates an example switch between transcode servers of different data centers for synchronizing streaming media for a migration feature, in accordance with at least one embodiment.

FIG. 3 illustrates an example switch between transcode servers of different data centers for synchronizing streaming media for a migration feature, in accordance with at least one embodiment. In embodiments, transcode servers of data centers may be configured to transcode received live streaming media content by decoding the media content from a first format and then re-encoding it into a different format. This process may generate video segments and playlists that correspond to the transcoded video segments. The playlists may be provided to video players and may be used by the video players to request the transcoded video segments. The video players may then request and receive the transcoded video segments and play the video content. Live streaming content may be transmitted and played by video players while other portions of the live streaming content are still being transmitted. Transcoding video content can result in video content that is segmented into multiple video segments which are portions of video content that include multiple frames and that are requested by video players using a playlist. When migrating live content streams between data centers this can introduce asynchronous live content streams as the segmentation of a current transcode server for one data center may be unaligned with the segmentation of a transcode server of a different data center.

The migration features described herein may utilize a segmentation algorithm that generates segment metadata that may be transmitted, along with incoming live content streams, to one or more transcode servers of various data centers. The ingest service servers may determine to start a new segment (media segment) and generate and send a segment start metadata tag right before the new segment, thereby indicating the frame on which the new segment is to begin. The segment metadata may include timestamp information (e.g., decode timestamp and composition timestamp) and instantaneous decoder refresh (IDR) information, which can be used by the transcode servers of the different data servers to process and output a corresponding segment sequence number and presentation timestamp later on. By utilizing such features and algorithms, the transcode servers of different data centers can connect to the same video content stream (e.g., the live content stream received by the ingest service servers) and generate aligned and synchronized segments and playlists.

FIG. 3 depicts video content 202 which may be divided into segments 221-235. The sequence numbers of segments 221-235 are identical to their reference numbers in FIG. 3. In embodiments, a segmentation algorithm implemented by the ingest service servers may divide or video content 202 into segments 221-235. The ingest service servers may generate segment metadata 214 that may be sent, along with incoming video content 202, to one or more transcode servers such as transcode server 250 and transcode server 252. In embodiments, transcode server 250 may be associated with a first data center (which may be a malfunctioning data center), and transcode server 252 may be associated with a different data center (second data center or candidate data center). In embodiments, the transcode servers 250 and 252 may be configured to transcode the video content 202. The segment metadata 214 may indicate a starting location, within video content 202, for each of the segments 221-235. As illustrated in FIG. 3, production portion 204 includes a portion of video content 202 that transcode server 250 uses to produce segments and playlists. Production portion 204 as depicted in FIG. 3 includes segments 221-227. The initial transcoding of video content 101 may be performed by transcode server 250 of a first data center. However, as described with reference to the migration features herein the job of transcoding the video content 202 is migrated to a different data center and thus to a different transcode server (252).

As illustrated in FIG. 3, production portion 206 is a portion of video content 202 which transcode server 252 used to generate segments 228-235 and associated playlists. As described herein, for some period of time both transcode servers 250 and 252 of different data centers may product playlists and segments for video content 202. Time delays, latency, and other issues may be resolved by producing segments and playlists using both transcode servers 250 and 252 which overlap. Optional additional production portions 208 and 210 represent that each transcode server may begin or continue to transcode segments and playlists for video content 202 to ensure seamless transition of content processing between the transcode servers 250 and 252 of different data centers. As illustrated in FIG. 3, transmission portion 211 and transmission portion 212 are transmitted to video player 254 with no interruption in playback to a viewer viewing the video content 202 via video player 254. For example, the last segment included in transmission portion 211 is segment 227, whereas the first segment in transmission portion 212 is segment 228. The use of the segment metadata 214 ensures that the video player 254 receives sequential segments which are aligned despite being generated by different transcode severs 250 and 252 of different data centers. This ensures that segments 221-235 of video content 202 are transmitted in proper sequence and in their entirety without interrupting playback even though the live content streams have been migrated from one data center to another data center.

Figure 4:
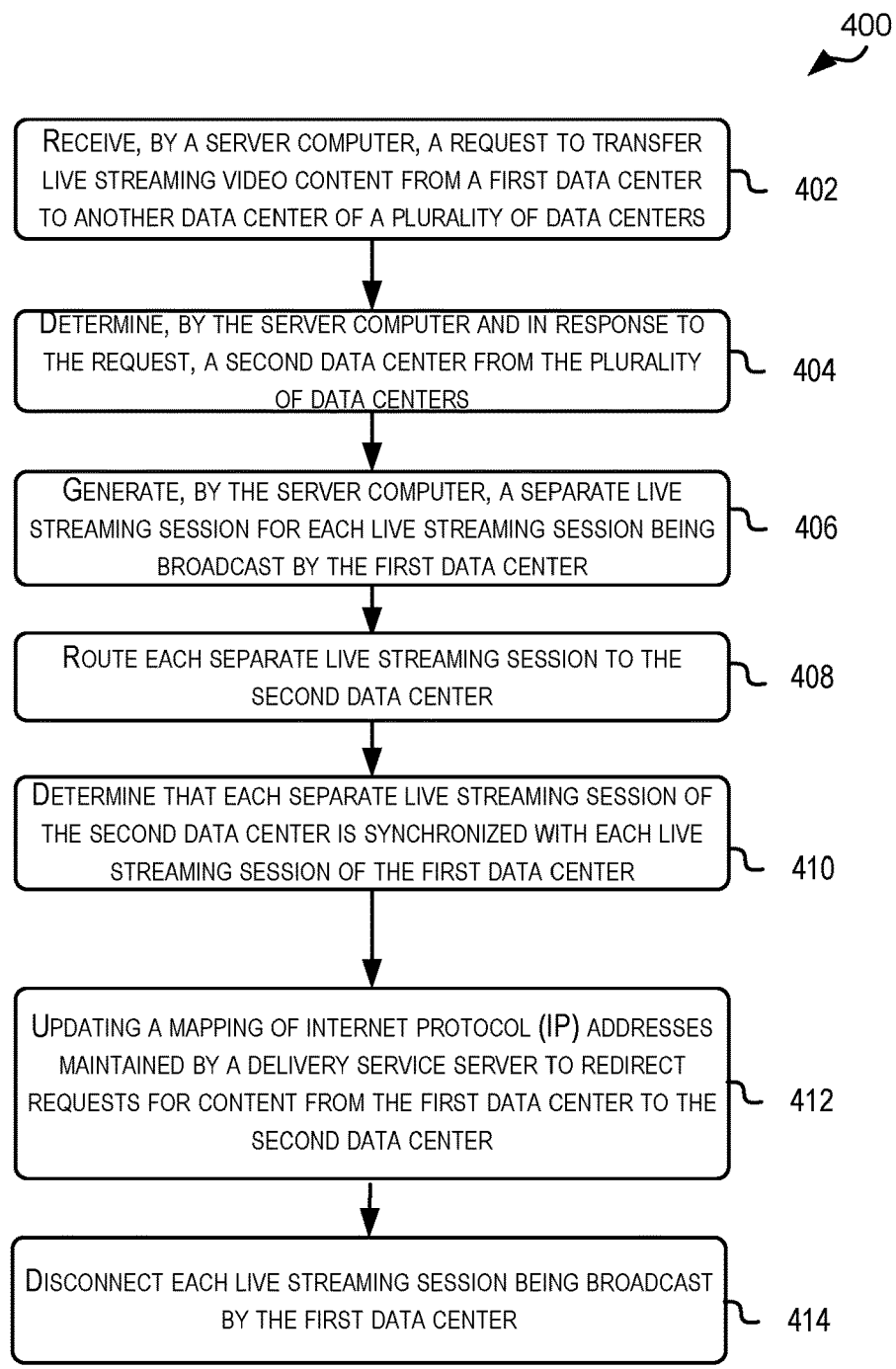
FIG. 4 illustrates an example flow chart for a migration feature, in accordance with at least one embodiment.
Figure 5:
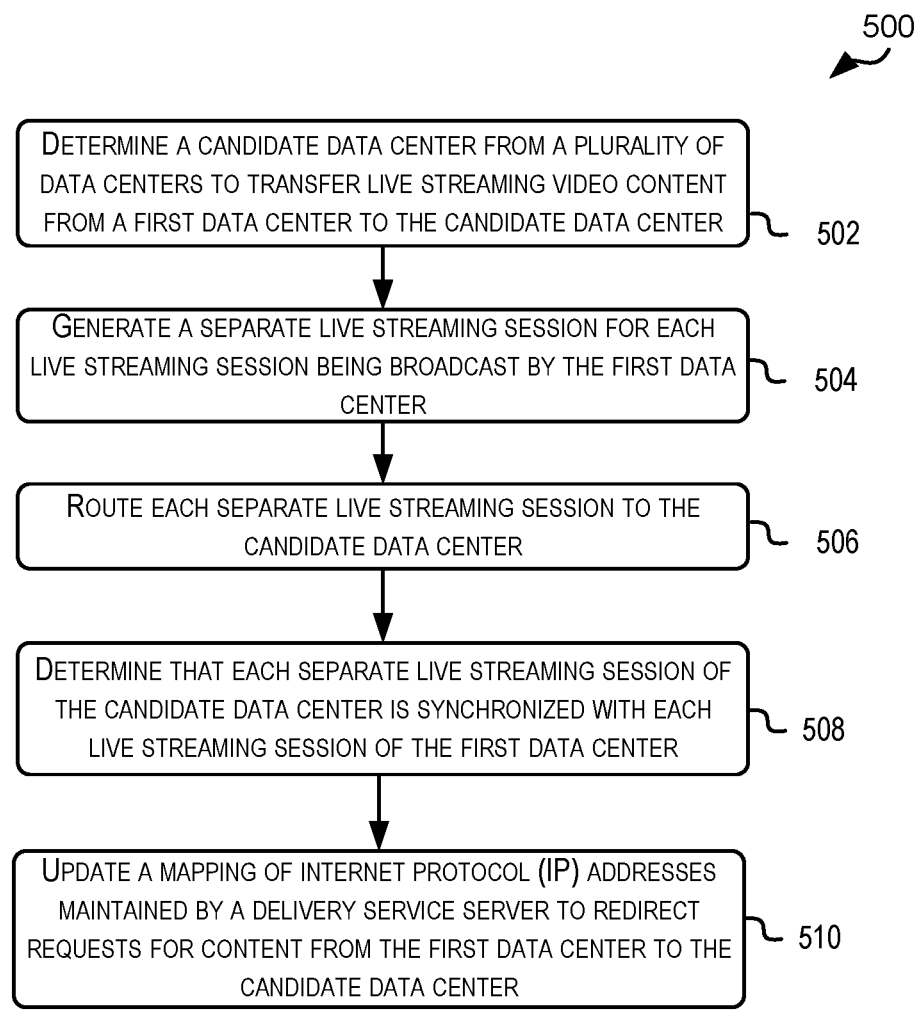
FIG. 5 illustrates an example flow chart for a migration feature, in accordance with at least one embodiment.

FIGS. 4 and 5 illustrate example flow charts for migration features, according to embodiments. These processes are illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures, and the like that perform particular functions or implement particular data types. The order in which the operations are described is not intended to be construed as a limitation, and any number of the described operations can be combined in any order and/or in parallel to implement the process.

Additionally, some, any, or all of the processes (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program including a plurality of instructions executable by one or more processors. The computer-readable storage medium may be non-transitory.

Figure 6:
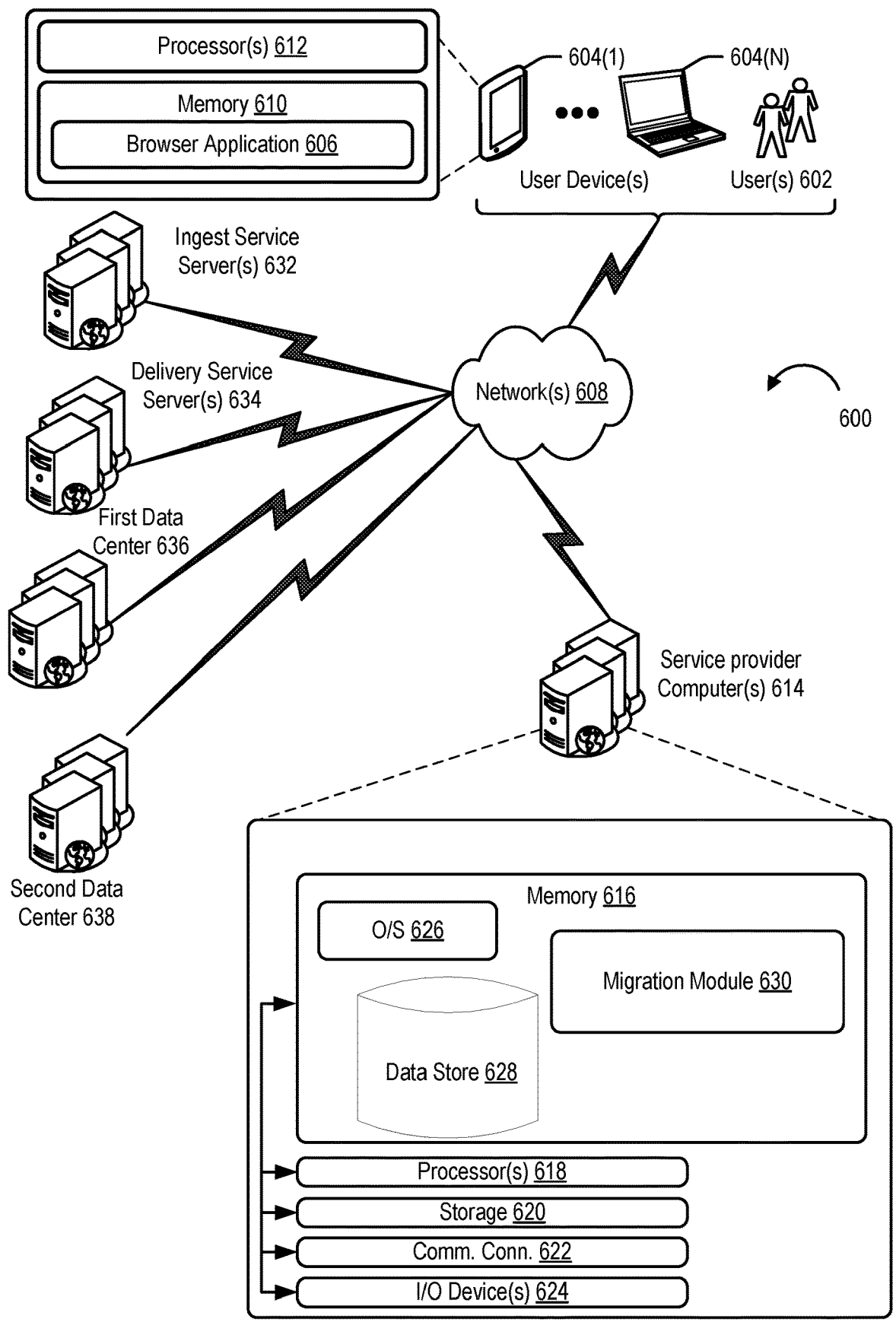
FIG. 6 illustrates an example architecture for a migration feature that includes one or more service provider computers, user devices, an ingest service server, a delivery service server, and one or more data centers, in accordance with at least one embodiment.

In some examples, service provider computers (service provider computers 614) utilizing at least the migration module 630 depicted in FIG. 6 may perform the processes 400 and 500 of FIGS. 4 and 5. In FIGS. 4 and 5, the process 400 may include receiving a request, by a server computer, a request to transfer live streaming video content from a first data center to another data center of a plurality of data centers at 402. In accordance with at least one embodiment, the request may be generated by a user, such as a system administrator or entity associated with the migration features described herein, in response to receiving information from the first data center. For example, the information may indicate or otherwise identify one or more issues with the first data center that impact their ability to properly broadcast live streaming content. The information may include an identification of a service associated with the first data center that is malfunctioning or not-operative, a weather event associated with a geographical location associated with the first data center such as an earthquake, a hurricane, or a tornado, a power outage associated with the first data center, or an indication that the capacity of the first data center has exceed a threshold.

The process 400 may include determining, in response to the request, a second data center from the plurality of data centers at 404. In embodiments, the second data center may be determined based on a capacity of the first data center and an available capacity of the second data center. In some embodiments, the determination of the second data center may further be based on a geographical location associated with the first data center and the second data center. For example, the service provider computers may attempt to locate available data centers that are geographically closer to the data center that is experiencing issues to reduce latency and network bandwidth issues. The process 400 may include generating a separate live streaming session for each live streaming session being broadcast by the first data center at 406. In accordance with at least one embodiment, the service provider computers may communicate with an ingest service server that is configured to receive media content that is used to generate each separate live streaming session and the live streaming session. In embodiments, a copy of each live streaming session currently being broadcast by the first data center is generated upon instruction by the service provider computers.

The process 400 may include routing each separate live streaming session to the second data center at 408. In embodiments, the ingest service server may route the newly generated separate live streaming sessions to the second data center such that for a certain period of time the first data center and the second data center may be configured to host the same live streaming sessions. In embodiments, the ingest service server may generate transcode from the received media content that is transmitted to a transcode manager of the second data center to generate each separate live streaming session. The process 400 may include determining that each separate live streaming session of the second data center is synchronized with each live streaming session of the first data center at 410. In embodiments, determining synchronization between the data centers includes communicating with a first transcode manager associated with the first data center and a second transcode manager of the second data center. The first transcode manager and the second transcode manager may generate and transmit metadata that can be compared to determine synchronization. In embodiments, determining synchronization between the first data center and the second data center occurs upon expiration of a certain time period such as 60 seconds, five minutes, 1 hour, etc.

The process 400 includes updating a mapping of internet protocol (IP) addresses maintained by a delivery service server to redirect requests for content from the first data center to the second data centers at 412. In accordance with at least one embodiment, instructions may be generated and transmitted to the delivery service server to update playlists and segments of the media content maintained by a dynamic mapping module of the delivery service server based on the media content received by the second data center via the ingest service server. The process 400 includes disconnecting each live streaming session being broadcast by the first data center at 414. In embodiments, the service provider computers may generate and transmit instructions to the ingest service server to stop generating transcode and providing content to the first data center thereby disconnecting all streams being broadcast by the first data center. In embodiments, the service provider computer may receive a notification or message from the first data center regarding the status of live streams being broadcast by the first data center.

The process 500 includes determining a candidate data center from a plurality of data centers to transfer live streaming video content from a first data center of the plurality of data centers to the candidate data center at 502. In embodiments, determining the candidate data server may be based at least in part on a capacity of the first data center and available capacity of each data center of the plurality of data centers and/or information from the first data center. The information may identify or otherwise indicate malfunctions or other issues with the first data center. In accordance with at least one embodiment, the capacity of the data centers (current and available) may include a number of live broadcast streams, network bandwidth, and/or available computer resources associated with each data center. In accordance with at least one embodiment, the service provider computers may request and receive a response from capacity managers associated with each data center of the plurality of data centers regarding the capacity of each data center.

The process 500 includes generating a separate live streaming session for each live streaming session being broadcast by the first data center at 504. In embodiments, the service provider computers may communicate with an ingest service server that receives media content that is used to generate each separate live streaming session and the live streaming session. The process 500 includes routing each separate live streaming session to the candidate data center at 506. The process 500 includes determining that each separate live streaming session of the candidate data center is synchronized with each live streaming session of the first data center at 508. In accordance with at least one embodiment, the service provider computers may communicate with a first transcode manager associated with the first data center and a second transcode manager of the candidate data center to verify or determine synchronization between each separate live streaming session and each live streaming session of the first data center and the candidate data center. The process 500 include updating a mapping of internet protocol (IP) addresses maintained by a delivery service server to redirect request for content from the first data center to the candidate data center at 510. In embodiments, more than one candidate data center may be identified based on the capacity, geographical location information of the first data center and each candidate data center, as well as geographical location information associated with viewers who are requesting content from the first data center. For example, if 50% of the viewers requesting content from the first data center are geographically closer to candidate data center A and the other 50% of the viewers requesting content from the first data center are geographically closer to candidate data center B, the service provider computers may appropriately redirect the viewership and live streams between data center A and B thereby migrating the streams from the first data center to data centers A and B simultaneously.

FIG. 6 illustrates an example architecture for a migration feature that includes one or more service provider computers, user devices, an ingest service server, a delivery service server, and one or more data centers, in accordance with at least one embodiment. In architecture 600, one or more users 602 (e.g., entities associated with data centers and computer systems implementing the migration feature) may utilize user computing devices 604(1)-(N) (collectively, user devices 604) to access a browser application 606 or a user interface (UI) accessible through the browser application 606 and via one or more networks 608, to receive alarms, updates, and/or information about the status or health of a data center which may be presented and interacted with via browser application 606 or the UI accessible through the browser application 606. The "browser application" 606 can be any browser control or native application that can access and display a network page or other information. A native application may include an application or program that has been developed for use on a particular platform (such as an operating system) or a particular device (such as a particular type of mobile device).

In accordance with at least one embodiment, the user devices 604 may be configured for communicating with service provider computers 614, ingest service servers 632, delivery service servers 634, first data center 636, and second data center 638 via networks 608. The user devices 604 may include at least one memory 610 and one or more processing units or processor(s) 612. The memory 610 may store program instructions that are loadable and executable on the processor(s) 612, as well as data generated during the execution of these programs. Depending on the configuration and type of the user devices 604, the memory 610 may be volatile (such as random access memory (RAM)) and/or non-volatile (such as read-only memory (ROM), flash memory, etc.). The user devices 604 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the user devices 604. In some implementations, the memory 610 may include multiple different types of memory, such as static random access memory (SRAM), dynamic random access memory (DRAM), or ROM.

Turning to the contents of the memory 610 in more detail, the memory 610 may include an operating system and one or more application programs or services for implementing the features disclosed herein. Additionally, the memory 610 may include one or more modules for implementing the features described herein including a migration module 630.

The architecture 600 may also include one or more service provider computers 614 that may, in some examples, provide computing resources such as, but not limited to, client entities, low latency data storage, durable data storage, data access, management, virtualization, hosted computing environment or "cloud-based" solutions, migration feature implementation, etc. The service provider computers 614 may implement or be an example of the service provider computer(s) described herein with reference to FIGS. 1-5 and throughout the disclosure. The one or more service provider computers 614 may also be operable to provide site hosting, computer application development, and/or implementation platforms, combinations of the foregoing, or the like to the one or more users 602 via user devices 604.

In some examples, the networks 608 may include any one or a combination of many different types of networks, such as cable networks, the Internet, wireless networks, cellular networks, and other private and/or public networks. While the illustrated examples represent the users 602 communicating with the service provider computers 614 over the networks 608, the described techniques may equally apply in instances where the users 602 interact with the one or more service provider computers 614 via the one or more user devices 604 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer arrangements, etc.). In embodiments, the users 602 may communicate with the ingest service servers 632, delivery service servers 634, first data center 636, and second data center 638 via networks 1108, and the ingest service servers 632, delivery service servers 634, first data center 636, and second data center 638 may communicate with the service provider computers 614 via networks 608.

The one or more service provider computers 614 may be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more service provider computers 614 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or a distributed computing environment. In some examples, the one or more service provider computers 614 may be in communication with the user device 604 via the networks 608, or via other network connections. The one or more service provider computers 614 may include one or more servers, perhaps arranged in a cluster or as individual servers not associated with one another.

In one illustrative configuration, the one or more service provider computers 614 may include at least one memory 616 and one or more processing units or processor(s) 618. The processor(s) 618 may be implemented as appropriate in hardware, computer-executable instructions, firmware, or combination thereof. Computer-executable instruction or firmware implementations of the processor(s) 618 may include computer-executable or machine-executable instructions written in any suitable programming language to perform the various functions described when executed by a hardware computing device, such as a processor. The memory 616 may store program instructions that are loadable and executable on the processor(s) 618, as well as data generated during the execution of these programs. Depending on the configuration and type of the one or more service provider computers 614, the memory 616 may be volatile (such as RAM) and/or non-volatile (such as ROM, flash memory, etc.). The one or more service provider computers 614 or servers may also include additional storage 620, which may include removable storage and/or non-removable storage. The additional storage 620 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 616 may include multiple different types of memory, such as SRAM, DRAM, or ROM.

The memory 616, the additional storage 620, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 616 and the additional storage 620 are all examples of non-transitory computer storage media. Additional types of non-transitory computer storage media that may be present in the one or more service provider computers 614 may include, but are not limited to, PRAM, SRAM, DRAM, RAM, ROM, EEPROM, flash memory or other memory technology, CD-ROM, DVD, or other optical storage, magnetic cassettes, magnetic tape, magnetic disk storage or other magnetic storage devices, or any other medium which can be used to store the desired information and which can be accessed by the one or more service provider computers 614. Combinations of any of the above should also be included within the scope of non-transitory computer-readable media.

The one or more service provider computers 614 may also contain communication connection interface(s) 622 that allow the one or more service provider computers 614 to communicate with a data store, another computing device or server, user terminals, and/or other devices on the networks 608. The one or more service provider computers 614 may also include I/O device(s) 624, such as a keyboard, a mouse, a pen, a voice input device, a touch input device, a display, speakers, a printer, etc.

Turning to the contents of the memory 616 in more detail, the memory 616 may include an operating system 626, one or more data stores 628, and/or one or more application programs or services for implementing the features disclosed herein including the migration module 630. In embodiments, the service provider computers 614 and the migration module 630 may be configured to generate and transmit instructions, via networks 608, to ingest service servers 632, delivery service servers 634, first data center 636, second data center 638, and user device 604 to migrate live streams of media content from first data center 636 to second data center 638 or other data centers (not pictured). For example, user 602 via user device 604 may receive information from first data center 636 via networks 608 which identifies an issue with the status, health, or broadcasting ability of the first data center 636. In response to receiving the information, user 602 via user device 604 and networks 608 may provide a request to the service provider computers 614 to transfer the live streaming broadcasts of the first data center 636 to the second data center 638.

The service provider computers 614 and migration module 630 may determine an appropriate data center, such as second data center 638, based on the current capacity of the first data center 636 and the capacity (available capacity) of other potential data centers such as second data center 638. In embodiments, the migration module 630 may utilize other information associated with the first data center 636 as well as other potential candidate data centers such as the second data center 638 that includes geographical location information for each data center (636 and 638). The information may include geographical location information for viewers of the broadcasts provided by the first data center 636 which are obtained by the first data center 636 and provided to the service provider computers 614. In accordance with at least one embodiment, the migration module 630 may be configured to generate a separate live streaming session for each live streaming session being broadcast by the first data center 636 by communicating with ingest service servers 632. In embodiments, the ingest service severs 632 may be configured to receive media content generated by content providers. As described with reference to FIG. 1, the ingest service servers 632 may be configured to generate transcode of the media content received which can be routed, upon instructions from the service provider computers 614 and migration module 630, to the second data center 638. The migration module 630 and service provider computers 614 may be configured to verify or determine that each separate live streaming session of the second data center 638 is synchronized with each live streaming session of the first data center 636. Verifying or determining synchronization between the two data centers (636 and 638) may include communicating, by the service provider computers 614 and migration module 630 with transcode managers associated with each data center (636 and 638). Upon verifying/ determining synchronization of the live streaming sessions, the migration module 630 and service provider computers 614 may be configured to transmit instructions for delivery service server 634 for updating a mapping of internet protocol (IP) addresses maintained by the delivery service server 634. The updating of the mapping of the IP addresses results in redirection of requests received by the delivery service server 634 for content by viewers (not pictured) from the first data center 636 to the second data center 638. In accordance with at least one embodiment, the migration module 630 may be configured to generate and transmit instructions to the ingest service server 632, via networks 608, to disconnect each live streaming session being broadcast by the first data center 636.

Figure 7:
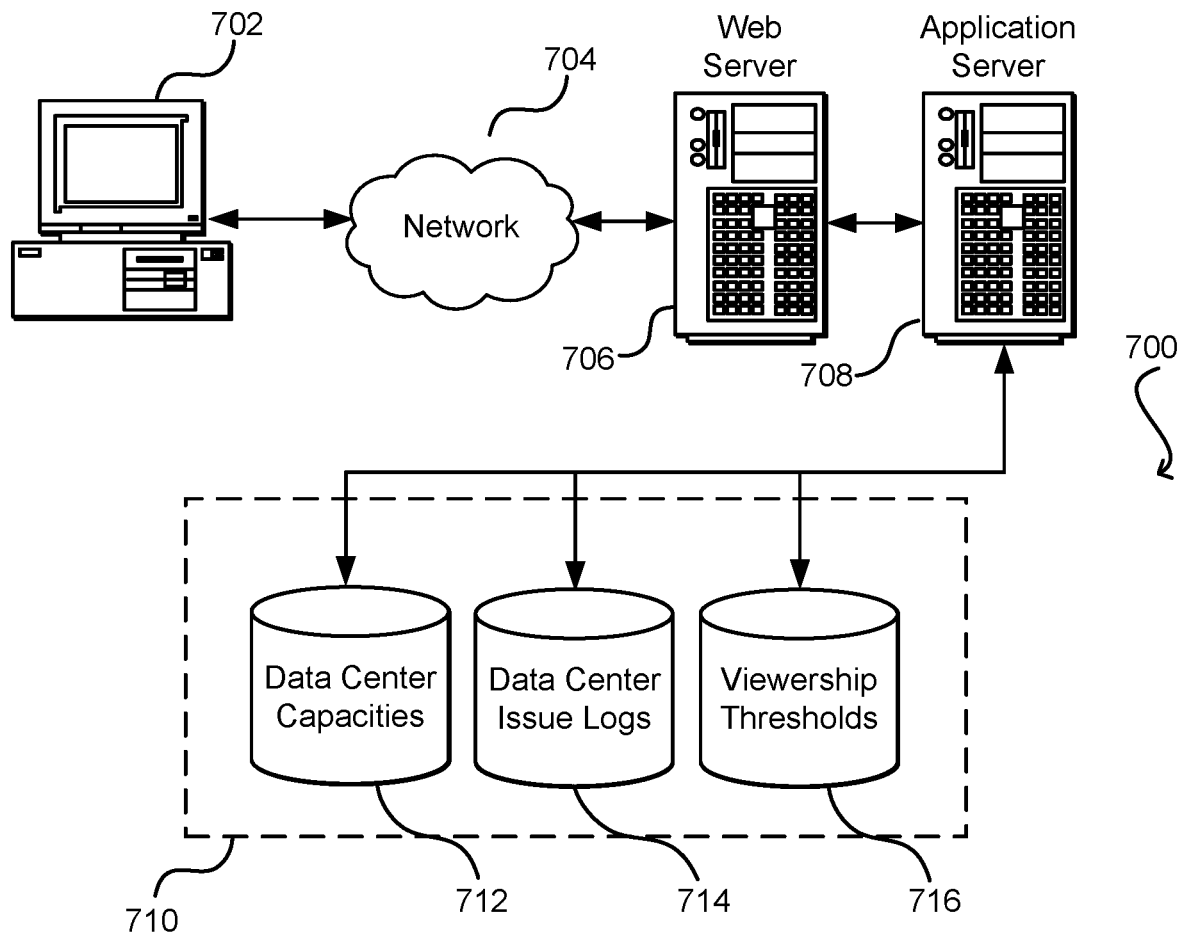
FIG. 7 illustrates an environment in which various embodiments can be implemented.

FIG. 7 illustrates aspects of an example environment 700 for implementing aspects in accordance with various embodiments. As will be appreciated, although a Web-based environment is used for purposes of explanation, different environments may be used, as appropriate, to implement various embodiments. The environment includes an electronic client device 702, which can include any appropriate device operable to send and receive requests, messages, or information over an appropriate network 704 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 702 and the application server 708, can be handled by the Web server. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing data center capacities 712 and viewership thresholds 716, which can be used to serve content for the production side as well as determine appropriate data centers as potential candidates to transfer live streaming content to in situations where another data center is down or having issues as described herein. The data store 710 also is shown to include a mechanism for storing data center issue logs 714, which can be used for reporting, analysis, or other such purposes such as identifying patterns of issues, failures, or bugs associated with certain data centers which invoke the migration of live streams from one data center to another data center as described herein. It should be understood that there can be many other aspects that may need to be stored in the data store, such as for page image information and to access right information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 702. Information for a particular item of interest can be viewed in a dedicated page or window of the browser. In another example, a user associated with the service provider computers implementing the migration feature may receive information such as an alert or alarm that a first data center is having issues. The user may utilize user device 702 to request migration of the live streams from the first data center to another data center. In such examples the web server 706 and/or application server 708 may invoke several APIs as well as provide messages to servers as described with reference to FIG. 6 to identify an appropriate data center, synchronize the live streams, and migrate the live streams from the first data center to the second data center. Confirmation of migration and disconnect from the first data center may be provided to the user via the user device 702.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGP") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
receiving, by a server computer, a request to transfer live streaming video content from a first data center to another data center of a plurality of data centers;
determining, by the server computer and in response to the request, a second data center from the plurality of data centers based at least in part on a capacity of the first data center and available capacity of each data center of the plurality of data centers;
generating, by the server computer, a separate live streaming session for each live streaming session being broadcast by the first data center by communicating with an ingest service server that receives media content used to generate each separate live streaming session and the live streaming session;
routing, by the server computer, each separate live streaming session to the second data center;
determining, by the server computer, that each separate live streaming session of the second data center is synchronized with each live streaming session of the first data center by communicating with a first transcode manager associated with the first data center and a second transcode manager associated with the second data center;
updating, by the server computer, a mapping of internet protocol (IP) addresses maintained by a delivery service server to redirect requests for content from the first data center to the second data center; and
disconnecting, by the server computer, each live streaming session being broadcast by the first data center by communicating with the ingest service server.

2. The computer-implemented method of claim 1, wherein determining the second data center from the plurality of data centers is further based at least in part on a geographic location of the first data center and the geographic location of each of the plurality of data centers.

3. The computer-implemented method of claim 1, wherein determining, by the server computer, that each separate live streaming session of the second data center is synchronized with each live streaming session of the first data center based at least in part upon expiration of a certain time period.

4. The computer-implemented method of claim 1, further comprising instructing, by the server computer, the delivery services server to update playlists and segments of the media content maintained in a dynamic mapping module of the delivery services server based on the media content received by the second data center from the ingest service server.

5. A non-transitory computer-readable storage medium storing computer-executable instructions that, when executed by a computer system, configure the computer system to perform operations comprising:
determining a candidate data center from a plurality of data centers to transfer live streaming video content from a first data center of the plurality of data centers to the candidate data center, the determining of the candidate data center based at least in part on: (1) a capacity of the first data center and available capacity of each data center of the plurality of data centers, and (2) information from the first data center;
generating a separate live streaming session for each live streaming session being broadcast by the first data center by communicating with an ingest service server that receives media content used to generate each separate live streaming session and the live streaming session;
routing each separate live streaming session to the candidate data center;

determining that each separate live streaming session of the candidate data center is synchronized with each live streaming session of the first data center by communicating with a first transcode manager associated with the first data center and a second transcode manager associated with the candidate data center; and updating a mapping of internet protocol (IP) addresses maintained by a delivery service server to redirect requests for content from the first data center to the candidate data center.

6. The non-transitory computer-readable storage medium of claim 5, wherein the information identifies a service associated with the first data center is malfunctioning or not-operative, a weather event associated with a geographical area associated with the first data center, a power outage associated with the first data center, or an indication that the capacity of the first data center has exceeded a threshold.

7. The non-transitory computer-readable storage medium of claim 5, wherein determining the candidate data center is further based at least in part on a request from a user associated with the computer system and on behalf of the first data center.

8. The non-transitory computer-readable storage medium of claim 5, wherein determining that each separate live streaming session of the candidate data center is synchronized with each live streaming session of the first data center is based at least in part on metadata from the first transcode manager and the second transcode manager.

9. The non-transitory computer-readable storage medium of claim 5, wherein the instructions, when executed by the computer system, further configure the computer system to disconnect each live streaming session being broadcast by the first data center by communicating with the ingest service server.

10. The non-transitory computer-readable storage medium of claim 5, wherein determining the capacity of the first data center and the available capacity of each data center of the plurality of candidate data centers is based at least in part on requesting the capacity and the available capacity from associated capacity managers of the first data center and the plurality of data centers.

11. The non-transitory computer-readable storage medium of claim 10, wherein the capacity of the first data center and the available capacity of the plurality of data centers includes a number of live broadcast streams, network bandwidth, and available computer resources.

12. The non-transitory computer-readable storage medium of claim 5, wherein determining the candidate data center from the plurality of data centers is further based at least in part on a geographic location associated with the first data center and each data center of the plurality of data centers.

13. The non-transitory computer-readable storage medium of claim 12, wherein the instructions, when executed by the computer system, further configure the computer system to determine a number of data centers from the plurality of data centers based at least in part on the geographic location associated with the first data center and each data center of the plurality of data centers.

14. A computer system comprising:
a memory configured to store computer-executable instructions; and a processor in communication with the memory configured to execute the computer-executable instructions to at least:
receive a request to transfer live streaming video content from a first data center to another data center of a plurality of data centers;
in response to the request determine a second data center from the plurality of data centers based at least in part on a capacity of the first data center and available capacity of each data center of the plurality of data centers;
generate a separate live streaming session for each live streaming session being broadcast by the first data center by communicating with an ingest service server that receives media content used to generate each separate live streaming session and the live streaming session;
route each separate live streaming session to the second data center;
update a mapping of internet protocol (IP) addresses maintained by a delivery service server to redirect requests for content from the first data center to the second data center; and
disconnect each live streaming session being broadcast by the first data center by communicating with the ingest service server.

15. The computer system of claim 14, wherein the processor in 2 communication with the memory is configured to execute the computer-executable instructions to at least determine that each separate live streaming session of the second data center is synchronized with each live streaming session of the first data center by communicating with a first transcode manager associated with the first data center and a second transcode manager associated with the second data center.

16. The computer system of claim 14, wherein routing each separate live streaming session to the second data center includes generating transcode that is transmitted to a transcode manager of the second data center.

17. The computer system of claim 14, wherein the processor in communication with the memory is configured to execute the computer-executable instructions to at least transmit a confirmation request to the first data center to determine that the live streaming video content is disconnected from the first data center.

18. The computer system of claim 14, wherein the processor in communication with the memory is configured to execute the computer-executable instructions to at least obtain geographic location information for viewers of the live streaming video content from the first data center.

19. The computer system of claim 18, wherein the processor in communication with the memory is configured to execute the computer-executable instructions to at least determine one or more data centers from the plurality of data centers based at least in part on the geographic location information for the viewers and the geographic location information of the one or more data centers.

20. The computer system of claim 19, wherein the processor in communication with the memory is configured to execute the computer-executable instructions to at least update the mapping of the IP addresses maintained by the delivery service server to redirect requests for content from the first data center to the one or more data centers.

* * * * *